United States Patent Office 3,140,281
Patented July 7, 1964

3,140,281
PROCESS FOR THE PREPARATION OF CODEHYDROGENASE I (DIPHOSPHOPYRIDINE NUCLEOTIDE) OF HIGH PURITY FROM YEAST
Kazuo Okunuki, Kawamo, Takarazuka-shi, Hyogo-ken, Bunji Hagihara, Amagasaki-shi, Hyogo-ken, Masateru Shin, Fuse-shi, Osaka-fu, and Ichiro Sekuzu, Joto-ku, Osaka-shi, Japan, assignors to Sankyo Company, Limited, Tokyo, Japan
No Drawing. Filed June 1, 1961, Ser. No. 114,046
Claims priority, application Japan June 13, 1960
4 Claims. (Cl. 260—211.5)

This invention relates to a process for preparing codehydrogenase I (diphosphopyridine nucleotide) of high purity from yeast.

Codehydrogenase I is a substance playing an important role in metabolism of organisms as are thiamine (vitamin $B_1$) and riboflavin (vitamin $B_2$). It is an important material for scientific studies in medicine, biochemistry, physiology, bacteriology, and moreover, is promising in its use in medicinal and pharmaceutical preparations.

In general, codehydrogenase I may be extracted from yeast and animal tissues in purified form. A number of processes for the extraction and purification have been hitherto reported, but the use of these processes is restricted, because despite the use of large amounts of expensive reagents a number of steps involved, purity of the product is low, and moreover, the yield is very low too.

Recently processes for obtaining highly purified codehydrogenase I using anion exchange resin have been reported. These processes are not directly applicable to extraction of codehydrogenase I from natural sources; with these processes only further purification of partial purified product is feasible.

For example, a process for preparing solution containing codehydrogenase I from yeast has been described in Japanese Patent No. 216,748. The process involves the steps of extracting codehydrogenase I from yeast to obtain aqueous solution containing the same, passing the solution after acidified through a weakly acidic cation exchange resin column bufferized to acidic nature to adsorb the codehydrogenase I on the resin, washing the resin layer with a weakly acidic buffer to remove impurities and eluting the codehydrogenase I with an alkaline buffer to give the desired solution. As described in the specification of said patent, if organic solvent-precipitation method, for example, using ethanol or acetone is applied directly to the eluate to produce powder product, brownish product of purity 50–60% is obtained but preparation of product of purity higher than 80% would be difficultly feasible. Alternatively, after precipitation of codehydrogenase I in the eluate as the silver salt and removal of the silver with hydrogen sulfide, fractional precipitation with ethanol would give almost colorless product of purity more than 80%, but the procedures involved are complicated.

It is an object of this invention to provide a process for preparing codehydrogenase I of high purity easily without the above-mentioned disadvantages associated. Another object of this invention will be apparent from the disclosure made herein.

According to the present invention, the aforementioned and other object can be achieved by passing aqueous solution containing codehydrogenase I obtained from extraction of yeast through high-porous weakly basic anion exchange resin in the salt form to remove impurities such as nucleotide substances and pigments contained therein by adsorption on the resin and to obtain colorless solution containing codehydrogenase I, adsorbing the codehydrogenase I on high-porous strongly acidic cation exchange resin of the sulfonic type in the hydrogen form by passing the solution after acidified through the resin, after washing said resin layer with an acidic buffer, eluting the aforementioned codehydrogenase I with a weakly acidic or neutral buffer and recovering codehydrogenase I from the eluate.

The above-described process according to the present invention is described below in more particulars. Aqueous solution containing codehydrogenase I obtained from extraction of yeast is passed through high-porous weakly basic anion exchange resin in the salt form, such as for example, the acetate, formate, chloride or phosphate form, to remove impurities such as nucleotide substances and pigments contained therein by adsorption on the resin and to obtain colorless solution containing codehydrogenase I. The codehydrogenase I-containing solution is then treated with mineral acid such as hydrochloric, sulfuric, nitric or phosphoric acid or organic acid such as formic or acetic acid to a solution of pH about 2–3 and the resulting solution is passed through high-porous strongly acidic cation exchange resin of the sulfonic type in the hydrogen form to adsorb the codehydrogenase I on the resin. Next, the resin layer is washed with an acidic buffer or pH 2–3 such as ammonium-chloride buffer and then the codehydrogenase I is eluted with a weakly acidic neutral buffer of pH 4–7 such as acetate or citrate buffer.

Codehydrogenase I may be recovered from the eluate by known procedures, for example by precipitation with organic solvents such as acetone and ethanol from the acidified eluate.

It is possible in the process according to the present invention to obtain colorless solution of highly purified codehydrogenase I within a very short period of time. Moreover, without application of the silver-salt method, powder codehydrogenase I product of purity about 80–90% may be obtained from the solution by precipitating the same by adding organic solvent directly to the solution or after concentrated in vacuum. In addition, the cation exchange resin of lower capacity of adsorbing codehydrogenase I as compared with one used in the abovementioned patented process for adsorbing untreated yeast extract may be used because there is very small amount of impurities interrupting adsorption of codehydrogenase I on the strongly acidic cation exchange resin of the sulfonic type in the solution passed through said resin and the codehydrogenase I may be satisfactorily eluted from such resin with neutral or weakly acidic buffer, the use of alkaline buffer as in the abovementioned patented process being unnecessary.

The invention will be illustrated in greater detail by description in connection with the following specific examples of the practice of it.

*Example I*

Five kilograms of fresh press Baker's yeast is subjected to hot-water extraction by rapidly stirring a suspension of it in 4 l. of hot water at 85–90° C. for 15 min. The extract is rapidly cooled and mixed with 1 kg. of diatomaceous earth such as Super-Cel. Super-Cel is a trade name for a diatomaceous earth. The mixture is passed through a large Buchner funnel with Super-Cel using suction. The residual materials are suspended in 2 l. of water for washing. The combined filtrate and washing are yellow clear solution about 7 l. in volume.

High-porous weakly basic anion exchange resin, for example Duolite A–2, is treated with four times in volume of 1 N sodium-hydroxide solution followed by washing with water. The resin is then treated with the same volume of 1 N acetic acid to convert the former to the acetate form and is washed with water.

About one liter of the resin as treated above is charged in a glass chromatography tube 3.8 cm. in diameter to a resin column about 1 m. in height. The above-obtained yeast extract is passed through the resin column at a flow rate of 3 l. per hour. Almost the whole of impurities such as nucleotide substances and pigments is adsorbed on the resin and the whole content of codehydrogenase I is effluented. About two liters of the first effluent, however, contains no detectable codehydrogenase I and separated from the main effluent for use as washing liquid of the resin column.

After the main effluent from the anion exchange-resin column is acidified with hydrochloric acid to adjust pH to 2.5, the mixture is passed through a column of high-porous strongly acidic cation exchange resin in the hydrogen form, Duolite C–10, to adsorb the whole content of codehydrogenase I. The adsorption resin column is washed with 1 l. of 0.1 m. $NH_4Cl$ buffer solution, pH 2.5, and then with 1 l. of 0.3 m. $NH_4Cl$ buffer solution, pH 2.5.

For elution of the adsorbed codehydrogenase I on the resin 0.05 m. ammonium acetate buffer solution, pH 4.5 is used. The flow rate for the elution is 10 ml. per minute. The eluate is separately collected in 250 ml. fractions.

Combined fractions containing larger amount of codehydrogenase I are concentrated in vacuum and pH of the concentrate is adjusted with nitric acid to 2–3. Ethanol is added to the resulting mixture to a concentration of ethanol as high as 60% and the precipitates formed are removed. Ethanol is further added to the supernatant to a concentration of ethanol as high as 90%. The precipitates formed are collected, washed with ethanol, then with ether and dried in vacuum to prepare white powder of codehydrogenase I of purity about 80–90%.

*Example II*

Two kilograms of fresh press Baker's yeast is subjected to hot-water extraction by rapidly stirring a suspension of it in 2 l. of hot water at 85–90° C. for 15 min. The extract is rapidly cooled and mixed with 0.4 kg. of Super-Cel. The mixture is passed through a large Buchner funnel with Super-Cel using suction. The residual materials are suspended in 1 l. of water for washing. The combined filtrated and washing are yellow clear solution about 4 l. in volume.

High-porous weakly basic anion exchange resin, Duolite A–7, is treated with four times in volume of 1 N sodium-hydroxide solution followed by washing with water. The resin is then treated with the same volume of 1 N hydrochloric acid to convert the former to the chloride form and is washed with a large volume of water.

About one liter of the resin as treated above is charged in a glass chromatography tube 3.8 cm. in diameter to a resin column about 1 m. in height. The above-obtained yeast extract is passed through the resin column at a flow rate of 1 l. per hour. Almost the whole of impurities such as nucleotide substances and pigments is adsorbed on the resin and the whole content of codehydrogenase I is effluented. About 0.5 liter of the first effluent, however, contains no detectable codehydrogenase I and separated from the main effluent for use as washing liquid of the resin column.

After the main effluent from the anion exchange-resin column is acidified with concentrated hydrochloric acid to adjust pH to 2.8, the mixture is passed through a column of high-porous strongly acidic cation exchange resin in the hydrogen form, Duolite C–25, to adsorb the whole content of codehydrogenase I. The resin adsorption column is washed with 1 l. of 0.1 m. $NH_4Cl$ buffer solution, pH 2.8, and then with 0.5 l. of 0.3 m. $NH_4Cl$ buffer solution, pH 2.8.

For elution of the adsorbed codehydrogenase I on the resin 0.03 m. ammonium acetate buffer solution, pH 4.5 is used. The flow rate for the elution is 10 ml. per minute. The eluate is separately collected in 100 ml. fractions.

Combined fractions containing larger amount of codehydrogenase I are concentrated in vacuum and pH of the concentrate is adjusted with nitric acid to 2–3. Ethanol is added to the resulting mixture to a concentration of ethanol as high as 60% and the precipitates formed are removed. Ethanol is further added to the supernatant to a concentration of ethanol as high as 90%. The precipitates formed are collected, washed with ethanol, then with ether and dried in vacuum to prepare white powder of codehydrogenase I of purity about 80–90%.

The Duolite exchange resins referred to in the examples are well known among those who use ion exchange resins and have been available on the market since the early nineteen forties.

Duolite A–7 is similar in composition and properties to Duolite A–2. Duolite A–2 is a weakly basic, phenolic-type, porous anion-exchange resin. The manufacture of Duolite A–2 is covered under U.S. Patent 2,389,865. This patent contains a description of the base polymer used in making the final aminated product. Methods of converting a base polymer to a weakly basic anion exchanger are well known. In general, this is achieved by amination with a polyethylene amine. Duolite A–7 is also a weakly basic, phenolic-type, porous anion-exchange resin. The active groups of this resin are secondary and tertiary amines.

Duolite C–10 is a strong-acid, phenolic-type highly porous cation-exchange resin. The base polymer used for making this resin is described in U.S. Patent 2,389,865. The active groups are methylene sulfonic acid groups. The phenol-formaldehyde matrix is converted to the cation exchanger by a known sulfitation reaction.

Duolite C–25 is a strong-acid, polystyrene, porous cation-exchange resin. It is produced in accordance with a method described in British Patent 785,157. This resin is furthermore described in an article entitled "High-Porosity Polystyrene Cation-Exchange Resins," Industrial & Engineering Chemistry, 48, No. 9, of September 1956, page 1469.

We claim:

1. A process for preparing codehydrogenase I of high purity from yeast which comprises passing an aqueous solution containing codehydrogenase I obtained from extraction of yeast through a high-porous weakly basic anion exchange resin in the salt form to obtain a colorless codehydrogenase I-containing solution, making the solution acidic, passing the resulting solution through a high-porous strongly acidic cation exchange resin of the sulfonic type in the hydrogen form, washing the resin layer with an acidic buffer and eluting the adsorbed codehydrogenase I with weakly acidic or neutral buffer and recovering codehydrogenase I from the eluate.

2. A process for preparing codehydrogenase I of high purity from yeast which comprises passing an aqueous solution containing codehydrogenase I obtained from extraction of yeast through a high porous weakly basic anion exchange resin in the salt form to obtain a colorless codehydrogenase I containing solution, making the solution acidic to a pH of about 2–3, passing the resulting solution through a high porous strongly acidic cation exchange resin of the sulfonic type in the hydrogen form, washing the resin layer with an acidic buffer of pH 2–3 and eluting the adsorbed codehydrogenase I with weakly acidic or neutral buffer of a pH of 4–7 and recovering codehydrogenase I from the eluate.

3. A process as claimed in claim 2, wherein said basic anion exchange resin is selected from the group consisting of Duolite A–2 and Duolite A–7 (trademarks) resins.

4. A process as claimed in claim 2, wherein said acidic cation exchange resin is selected from the group consisting of Duolite C–10 and Duolite C–25 (trademarks) resins.

References Cited in the file of this patent

UNITED STATES PATENTS

| 2,891,945 | Stark | June 23, 1959 |
| 3,015,655 | Stark | Jan. 2, 1962 |

FOREIGN PATENTS

| 216,748 | Japan | (30–4436) June 30, 1955 |

OTHER REFERENCES

Ion Exchangers in Organic and Biochemistry, 1957, pp. 382–387, Interscience Publishers Inc., N.Y., QD561C3.

Methods in Enzymology, vol. III, pages 876–878, Academic Press Inc., New York, 1957, QP601C72.